(12) United States Patent
Silva et al.

(10) Patent No.: US 11,714,615 B2
(45) Date of Patent: Aug. 1, 2023

(54) APPLICATION MIGRATION USING COST-AWARE CODE DEPENDENCY GRAPH

(71) Applicant: International Business Machines Corporation, Armonk, NY (US)

(72) Inventors: Bruno Silva, São Paulo (BR); Marco Aurelio Stelmar Netto, Sao Paulo (BR); Renato Luiz de Freitas Cunha, São Paulo (BR); Nelson Mimura Gonzalez, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/024,745

(22) Filed: Sep. 18, 2020

(65) Prior Publication Data

US 2022/0091829 A1    Mar. 24, 2022

(51) Int. Cl.
*G06F 8/41* (2018.01)
*G06F 9/455* (2018.01)
*G06F 9/48* (2006.01)

(52) U.S. Cl.
CPC .......... *G06F 8/433* (2013.01); *G06F 9/45558* (2013.01); *G06F 9/4856* (2013.01);
(Continued)

(58) Field of Classification Search
CPC .... G06F 8/433; G06F 9/45558; G06F 9/4856; G06F 2009/4557; G06F 2009/45595
(Continued)

(56) References Cited

U.S. PATENT DOCUMENTS 4,710,872 A * 12/1987 Scarborough ............. G06F 8/45
717/160
6,842,723 B2 * 1/2005 Alicherry .............. H04L 41/145
370/351
(Continued)

FOREIGN PATENT DOCUMENTS

CN      103218261 A    7/2013
DE      19815865 B4    11/2004
(Continued)

OTHER PUBLICATIONS

Piraghaj et al., "Virtual Machine Customization and Task Mapping Architecture for Efficient Allocation of Cloud Data Center Resources", Section B: Computer and Communications Networks and Systems The Computer Journal, vol. 59 No. 2, 2016, pp. 208-224.
(Continued)

*Primary Examiner* — Hang Pan
*Assistant Examiner* — Bradford F Wheaton
(74) *Attorney, Agent, or Firm* — Stosch Sabo

(57) ABSTRACT

Described are techniques for application migration. The techniques include migrating an application to a target cloud infrastructure and generating a cost-aware code dependency graph during execution of the application on the target cloud infrastructure. The techniques further include modifying the application by removing source code corresponding to unused nodes according to the cost-aware code dependency graph and replacing identified source code of a high-cost subgraph of the cost-aware code dependency graph with calls to a generated microservice configured to provide functionality similar to the identified source code. The techniques further include implementing the modified application on one or more virtual machines of the target cloud infrastructure.

18 Claims, 10 Drawing Sheets

(52) U.S. Cl.
CPC ............ *G06F 2009/4557* (2013.01); *G06F 2009/45595* (2013.01)

(58) Field of Classification Search
USPC ........................................... 717/155
See application file for complete search history.

(56) References Cited

U.S. PATENT DOCUMENTS

| | | | |
|---|---|---|---|
| 6,934,935 B1 | 8/2005 | Bennett et al. | |
| 7,757,222 B2 | 7/2010 | Liao et al. | |
| 8,108,838 B2 | 1/2012 | Asaad et al. | |
| 8,286,251 B2 | 10/2012 | Eker et al. | |
| 8,316,125 B2 | 11/2012 | DeHaan | |
| 8,352,935 B2 | 1/2013 | Isaacson et al. | |
| 8,468,518 B2 | 6/2013 | Wipfel | |
| 8,630,185 B1* | 1/2014 | Frumkin | H04L 45/12 370/238 |
| 8,806,015 B2 | 8/2014 | Dutta et al. | |
| 8,904,382 B2 | 12/2014 | Berg et al. | |
| 9,038,085 B2 | 5/2015 | Assuncao et al. | |
| 9,179,391 B2 | 11/2015 | Zhou et al. | |
| 9,672,019 B2 | 6/2017 | Sager et al. | |
| 10,061,830 B2 | 8/2018 | Denuit et al. | |
| 10,282,225 B2 | 5/2019 | Vincent | |
| 10,924,410 B1* | 2/2021 | Nee | H04L 67/566 |
| 2006/0150188 A1 | 7/2006 | Roman et al. | |
| 2008/0155100 A1 | 6/2008 | Ahmed et al. | |
| 2008/0183479 A1 | 7/2008 | Iwashita et al. | |
| 2012/0060142 A1 | 3/2012 | Fliess | |
| 2013/0074068 A1 | 3/2013 | Ciano et al. | |
| 2013/0185729 A1 | 7/2013 | Vasic et al. | |
| 2015/0172205 A1 | 6/2015 | Anderson et al. | |
| 2015/0180883 A1* | 6/2015 | Aktas | G06F 21/564 726/23 |
| 2016/0005016 A1* | 1/2016 | Eliahu | G06Q 20/28 705/44 |
| 2016/0036655 A1* | 2/2016 | Burton | H04L 41/5029 709/223 |
| 2016/0314014 A1 | 10/2016 | Dow et al. | |
| 2017/0255496 A1* | 9/2017 | Deng | G06F 9/4881 |
| 2018/0027060 A1* | 1/2018 | Metsch | G06F 12/1408 709/226 |
| 2018/0181685 A1* | 6/2018 | Roetteler | G06N 10/00 |
| 2018/0253773 A1 | 9/2018 | Evans | |
| 2018/0332109 A1* | 11/2018 | Branch | H04L 67/1004 |
| 2019/0340059 A1* | 11/2019 | Bagarolo | G06F 11/0772 |
| 2020/0019388 A1 | 1/2020 | Jaeger | |
| 2020/0192994 A1* | 6/2020 | Gupta | G06F 30/30 |
| 2021/0036925 A1* | 2/2021 | Boddam | H04L 41/5054 |
| 2021/0058345 A1* | 2/2021 | Yoon | H04L 51/02 |
| 2021/0263735 A1* | 8/2021 | Harishankar | G06F 8/76 |

FOREIGN PATENT DOCUMENTS

| | | |
|---|---|---|
| EP | 2092424 B1 | 12/2015 |
| JP | 5083204 B2 | 11/2012 |
| WO | 2016180433 A1 | 11/2016 |
| WO | 2017040326 A1 | 3/2017 |

OTHER PUBLICATIONS

Faitelson et al., "Functional Decomposition for Software Architecture Evolution", Communications in Computer and Information Science, Jul. 2018, 25 pages.

Boudali et al., "Architectural Availability Analysis of Software Decomposition for Local Recovery", 2009 Third IEEE International Conference on Secure Software Integration and Reliability Improvement, pp. 14-22.

Mell et al., "The NIST Definition of Cloud Computing", Recommendations of the National Institute of Standards and Technology, Sep. 2011, 7 pages.

"Patent Cooperation Treaty PCT International Search Report", Applicant's file reference, International application No. PCT/EP2021/073979 , International filing date Aug. 31, 2021, Priority Date Sep. 18, 2020, 15 pages.

Zhongshan et al., "Migrating Web Applications from Monolithic Structure to Microservices Architecture", Internetware 18, Sep. 16, 2018, Beijng, China © 2018 Association for Computing Machinery, 10 pages.

* cited by examiner

APPLICATION MIGRATION USING COST-AWARE CODE DEPENDENCY GRAPH

BACKGROUND

The present disclosure relates to application migration, and, more specifically, to application migration using a cost-aware code dependency graph.

Application migration is the process of moving a software application from one computing environment to another. For example, an application might be moved between data centers, from an on-premises server to a cloud provider's environment, from a public cloud to a private cloud, and the like.

Because applications are typically built to run on particular operating systems in specific network architectures or developed for a single cloud platform, migrating an application can pose a number of challenges. These challenges can include ensuring an application's dependencies and technical requirements are maintained while satisfying an enterprise's security, compliance, and cost constraints.

Efficient and effective migration of applications to (or between) cloud platforms is a priority for both application owners and cloud providers. The migration process includes identification of application parts that can be migrated, identification of application parts that must be adapted in order to be migrated, and the adaptation of the application. Furthermore, an appropriate set of cloud resources must also be selected to efficiently host the migrated application.

Currently, a developer can manually update an application so that it can be successfully migrated to, and implemented by, a target cloud environment. After updating the application, the developer can manually test the application. These current techniques make the application migration process prone to errors, labor-intensive, and time-consuming.

SUMMARY

Aspects of the present disclosure are directed toward a computer-implemented method comprising migrating an application to a target cloud infrastructure. The method further comprises generating a cost-aware code dependency graph during execution of the application on the target cloud infrastructure. The method further comprises modifying the application by removing source code corresponding to unused nodes according to the cost-aware code dependency graph and replacing identified source code of a high-cost subgraph of the cost-aware code dependency graph with calls to a generated microservice configured to provide functionality similar to the identified source code. The method further comprises implementing the modified application on one or more virtual machines of the target cloud infrastructure.

Advantageously, the aforementioned method enables automated, on-the-fly application decomposition such that a migrated application can be reconfigured once deployed on a target cloud infrastructure. Furthermore, the aforementioned method enables automated modification of the application in order to realize improved performance of the application on the target cloud infrastructure by removing source code corresponding to unused nodes and replacing identified source code of high-cost subgraphs with calls to a generated microservice. Removing unused source code can make an application more efficient and less prone to errors. Replacing high-cost subgraphs with a generated microservice can realized improved performance insofar as the generated microservice can be separately implemented on another virtual machine of the target cloud infrastructure that is adapted to efficiently implement the generated microservice.

Further aspects of the aforementioned method further include converting node costs in the cost-aware code dependency graph to edge costs by assigning a respective cost of a respective node to each edge directed to the respective node. Advantageously, converting node costs to edge costs facilitates the improved use of graph search algorithms configured to identify sub-graph costs.

Further aspects of the aforementioned method further include creating the generated microservice based on a highest-cost subgraph, replacing first source code associated with the highest-cost subgraph with the generated microservice, identifying a second subgraph with a similarity above a threshold to the highest-cost subgraph, and replacing second source code associated with the second subgraph with the generated microservice. Advantageously, using the generated microservice for a second subgraph with a similarity above a threshold to the highest-cost subgraph improves efficiency by reusing an already generated microservice for more than one component of the application.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
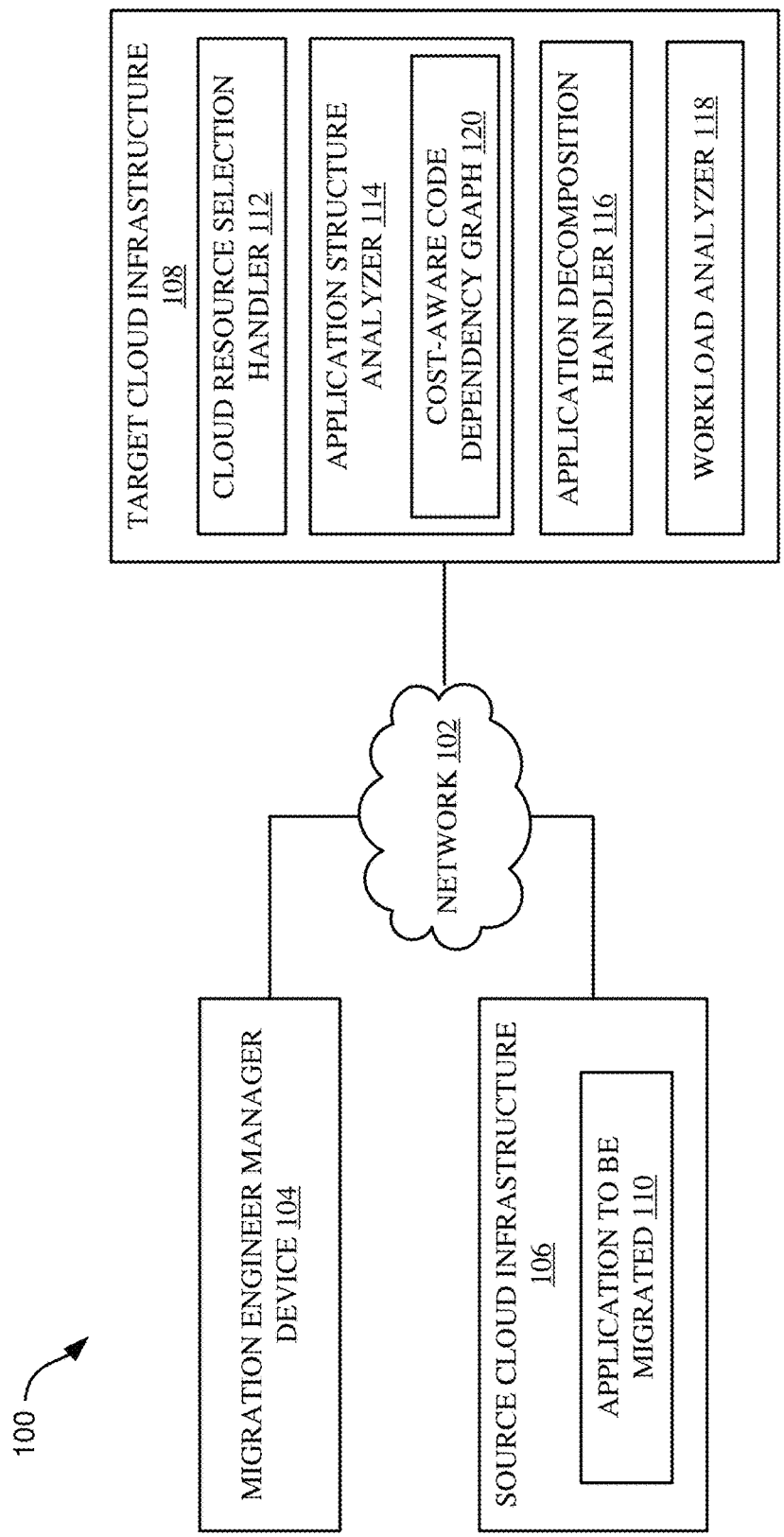
FIG. 1 illustrates a block diagram of an example computational environment for application migration, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward application migration, and, more specifically, application migration using a cost-aware code dependency graph. While not limited to such applications, embodiments of the present disclosure may be better understood in light of the aforementioned context.

Aspects of the present disclosure are directed toward techniques for automatically shrinking and decomposing an image including an application to be migrated to reduce operational costs for the application to be migrated in a target cloud platform. Aspects of the present disclosure realize numerous features such as, but not limited to (i) post-deployment on-the-fly application decomposition based on workload execution tracing and/or source code analysis; (ii) generation of a cost-aware code dependency graph based on the execution tracing and/or source code analysis, customizable objective functions, and/or collected performance metrics; (iii) removal (e.g., pruning) of unused nodes in the cost-aware code dependency graph; (iv) replacement of source code corresponding to high-cost subgraphs in the cost-aware code dependency graph with a generated microservice, where the generated microservice can be implemented by a different virtual machine of the target cloud platform than the application to be migrated; and/or (v) use of a generated microservice for other subgraphs in the cost-aware code dependency graph that are similar to the high-cost subgraph for which the generated microservice was originally created. Collectively, these features enable automated application modifications, where the modified application realizes reduced resource utilization (e.g., reduced memory and processor utilization) and/or reduced maintenance costs for applications that are migrated to a target cloud platform.

Referring now to FIG. 1, illustrated is an example computational environment 100 for application migration, in accordance with some embodiments of the present disclosure. The computational environment 100 can include a migration engineer manager device 104, a source cloud infrastructure 106, and a target cloud infrastructure 108 communicatively coupled to one another by a network 102. The engineer manager device 104 can be a laptop, tablet, desktop, server, or another configuration of hardware and/or software that can manage (e.g., according to user input from a migration engineer) a migration of an application to be migrated 110 from the source cloud infrastructure 106 to the target cloud infrastructure 108.

The source cloud infrastructure 106 includes the current hosting computing platform of the application to be migrated 110. Likewise, the target cloud infrastructure 108 includes the future hosting computing platform of the application to be migrated 110. Although the source cloud infrastructure 106 and the target cloud infrastructure 108 both include components suitable for electronic data processing such as, but not limited to, memory resources, processing resources, networking resources, other resources, and/or virtual machines (VMs) provisioned from any of the aforementioned resources, the type, quantity, and configuration of the components and/or VMs may be different. Furthermore, the source cloud infrastructure 106 and the target cloud infrastructure 108 can utilize different operating systems, different networking protocols, and/or different programmatic configurations. For example, source cloud infrastructure 106 can be on-premises hardware, a private cloud, a hybrid cloud, or a public cloud. Likewise, the target cloud infrastructure 108 can be a private cloud, a hybrid cloud, or a public cloud. In the event both the source cloud infrastructure 106 and the target cloud infrastructure 108 are a similar type of cloud infrastructure (e.g., each is a hybrid cloud configuration), the source cloud infrastructure 106 may be provided by a first vendor whereas the target cloud infrastructure 108 may be provided by a second vendor. In such situations, the first vendor and the second vendor can institute different schemes, protocols, and configurations that can facilitate modification of an application to be migrated 110 so that it will efficiently and effectively function on the target cloud infrastructure 108.

The application to be migrated 110 can be any application, service, workload, or other computer-implemented process or functionality. In some embodiments, the application to be migrated 110 can be packaged within a system image (not shown) including peripheral software, firmware, operating system, and the like for supporting implementation of the application to be migrated 110.

The target cloud infrastructure 108 can include functionality for modifying the application to be migrated 110 for efficient and effective deployment on the target cloud infrastructure 108. For example, the target cloud infrastructure 108 can include cloud resource selection handler 112, application structure analyzer 114, application decomposition handler 116, and workload analyzer 118. The cloud resource selection handler 112 can be configured for selecting and evaluating a set of cloud resource candidates available on the target cloud infrastructure 108 for use with the application to be migrated 110. Cloud resources can include memory resources, processing resources, networking resources, and the like. In some embodiments, the cloud resources can be packaged as predefined or customized VMs with distinct configurations of memory resources, processing resources, networking resources, and/or other resources that can be collectively adapted for the efficient implementation of certain types of workloads or microservices.

The application structure analyzer 114 can be configured to perform source code analysis and system calls of the application to be migrated 110 for the purposes of developing a cost-aware code dependency graph 120 for the application to be migrated 110. For example, the application structure analyzer 114 can implement tracing, log analysis, or other functionalities for understanding a program's execution. Furthermore, the application structure analyzer 114 can analyze the source code itself to identify structures, dependencies, components, functionalities, and/or other features of the source code. In some embodiments, the cost-aware code dependency graph 120 is formatted similarly to a call graph, call multigraph, control flow graph, or another graphical representations of calling relationships, subroutines, functionalities, and/or execution characteristics of the application to be migrated 110. The cost-aware code dependency graph 120 can further include information regarding usage of different components (e.g., nodes) of the application to be migrated 110 (e.g., used vs. unused nodes). Further, the cost-aware code dependency graph 120 can include information regarding resource costs of different components (e.g., nodes) of the application to be migrated 110.

The application decomposition handler 116 can be configured to decompose the application to be migrated 110 for the purposes of modifying the application to be migrated 110 for improved implemented on the target cloud infrastructure 108. For example, the application decomposition handler 116 can be configured to remove (e.g., prune) source code corresponding to unused nodes according to the cost-aware code dependency graph 120. As another example, the application decomposition handler 116 can be configured to replace source code corresponding to a high-cost subgraph of the cost-aware code dependency graph 120 with a generated microservice (not shown). Furthermore, in some embodiments, the application decomposition handler 116 can reuse the generated microservice to replace another subgraph of the cost-aware code dependency graph 120 that exhibits a similarity above a threshold with the original high-cost subgraph for which the generated microservice was originally made.

The workload analyzer 118 can be configured to evaluate the performance of components of the application to be migrated 110 in order to identify candidates for decomposition and/or evaluate performance once modifications are made (e.g., pruning of unused nodes, substitution of high-cost subgraphs with generated microservices, etc.). In some embodiments, the workload analyzer 118 can provide feedback to the cloud resource selection handler 112 for modifying cloud resources provided as VMs to aspects of the application to be migrated 110 to improve performance and/or efficiency of the application to be migrated 110.

Although the cloud resource selection handler 112, application structure analyzer 114, application decomposition handler 116, workload analyzer 118, and cost-aware code dependency graph 120 are shown on the target cloud infrastructure 108, one or more of these components can be located elsewhere in other embodiments. For example, in some embodiments, the aforementioned components can be located in the migration engineer manager device 104. Furthermore, in some embodiments, the aforementioned components are downloaded as software from a remote data processing device (not shown) to either the migration engineer manager device 104 or the target cloud infrastructure 108. Alternatively, the aforementioned components may not be downloaded at all, but may be housed in a remote data processing system (not shown) capable of provisioning, as a service, the functionality of the aforementioned components so that an application to be migrated 110 can first be provided to the remote data processing system, (not shown) and the remote data processing system (not shown) can then provide an updated version of the application to be migrated 110 to the target cloud infrastructure 108, where the updated version of the application to be migrated 110 realizes, when deployed on the target cloud infrastructure 108, improved resource utilization relative to the original application to be migrated 110.

Figure 2:
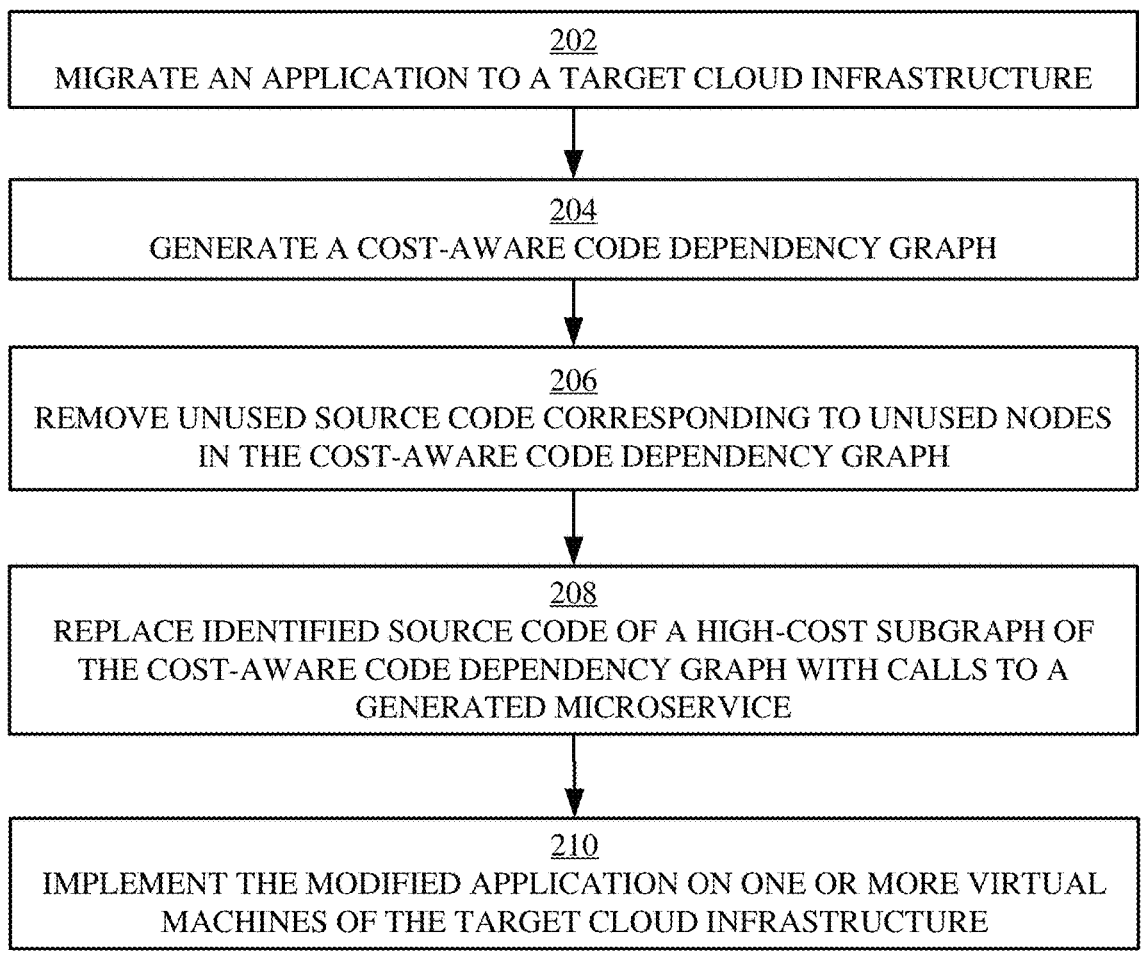
FIG. 2 illustrates a flowchart of an example method for migrating an application using a cost-aware code dependency graph, in accordance with some embodiments of the present disclosure.

Referring now to FIG. 2, illustrated is a flowchart of an example method 200 for application migration using a cost-aware code dependency graph, in accordance with some embodiments of the present disclosure. In some embodiments, the method 200 can be implemented by, for example, a target cloud infrastructure 108, a migration engineer manager device 104, a remote data processing system, a computer, a processor, or another configuration of hardware and/or software.

Operation 202 includes migrating an application (e.g., application to be migrated 110 of FIG. 1) to a target cloud infrastructure (e.g., target cloud infrastructure 108 of FIG. 1). In some embodiments, operation 202 includes deploying the application on the target cloud infrastructure. In some embodiments, the application is migrated to the target cloud infrastructure as part of a system image.

Operation 204 includes generating a cost-aware code dependency graph (e.g., cost-aware code dependency graph 120 of FIG. 1) during execution of the application on the target cloud infrastructure. In some embodiments, the cost-aware code dependency graph is generated using trace functions on the application during its execution and/or source code analysis of the application. In some embodiments, generating the cost-aware code dependency graph includes determining a cost associated with each node in the cost-aware code dependency graph, where the cost is representative of an amount of resources utilized during node execution. The resources utilized during node execution can include one or more selected from a group consisting of: memory utilized during the node execution, processor (CPU) usage during the node execution, Input/Output (I/O) operations implemented during the node execution, a frequency of node utilization over a predefined time, and/or duration of the node execution.

Operations 206 and 208 relate to modifying the application in order to realize improved performance of the application on the target cloud infrastructure. Operation 206 includes removing unused source code corresponding to unused nodes in the cost-aware code dependency graph. In some embodiments, nodes in the cost-aware code dependency graph are identified as unused if they have not been executed for a predetermined amount of time (e.g., five minutes, fifteen minutes, one hour, one day, etc.).

Operation 208 includes replacing identified source code of a high-cost subgraph of the cost-aware code dependency graph with calls to a generated microservice. In some embodiments, the generated microservice can be created according to the nodes in the high-cost subgraph, interrelationships between the nodes in the high-cost subgraph, and source code corresponding to the high-cost subgraph. In some embodiments, the generated microservice can be configured to execute on a different VM from the one or more VMs executing the application. In some embodiments, the different VM can include virtualized resources that are beneficial to the resource requirements of the generated microservice (e.g., increased processing resources for a computation-intensive microservice, etc.).

Operation 210 includes implementing the modified application on one or more VMs of the target cloud infrastructure. The modified application can exhibit improved performance relative to the originally migrated application as a result of the removed unused source code (corresponding to unused nodes) and/or the replaced identified source code (corresponding to a high-cost subgraph) with the generated microservice.

Figure 3:
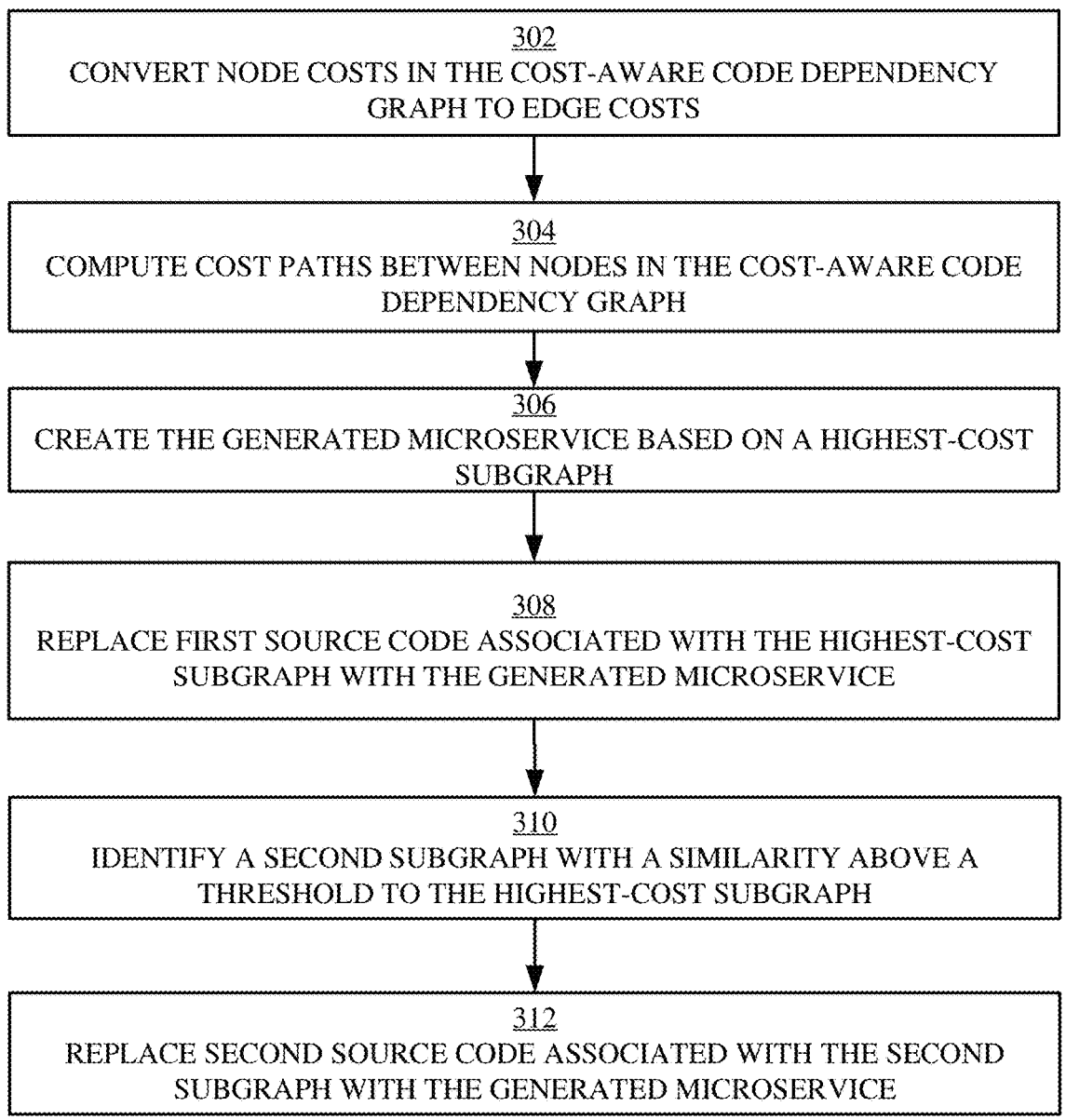
FIG. 3 illustrates a flowchart of an example method for reusing a generated microservice for similar subgraphs of a cost-aware code dependency graph, in accordance with some embodiments of the present disclosure.

Referring now to FIG. 3, illustrated is a flowchart of an example method 300 for reusing a generated microservice for similar subgraphs of a cost-aware code dependency graph, in accordance with some embodiments of the present disclosure. In some embodiments, the method 300 can be implemented by, for example, a target cloud infrastructure 108, a migration engineer manager device 104, a remote data processing system, a computer, a processor, or another configuration of hardware and/or software. In some embodiments, the method 300 is a sub-method of operation 208 of FIG. 2.

Operation 302 includes converting node costs in the cost-aware code dependency graph to edge costs. In some embodiments, node costs can be converted to edge costs by applying a respective node cost to each edge directed to the respective node.

Operation 304 includes computing cost paths between nodes in the cost-aware code dependency graph. In some embodiments, operation 304 utilizes the edge costs of operation 302 to compute the cost paths. In some embodiments, operation 304 utilizes a Dijkstra algorithm with Fibonacci heaps as a priority queue in order to compute the cost paths. Advantageously, Fibonacci heaps have asymptotic amortized constant time complexity, reducing the time complexity of Dijkstra's shortest path algorithm from $O(|V|^2)$ (scaling quadratically with the number of vertices in the graph) to $O(|E|+|V|\log|V|)$ (scaling linearly in the number of edges and quasilinear time in the number of vertices). This algorithmic formulation allows for efficient processing in large-scale graphs. As is understood by one skilled in the art, O represents a function that gives a measure of asymptotic performance of an algorithm, such as an algorithm configured to evaluate time complexity. Furthermore, $|E|$ can represent a number of edges in a graph whereas $|V|$ can represent a number of vertices in the graph. Finally, although a Dijkstra algorithm with Fibonacci heaps is discussed above, this is but one example and operation 304 can utilize any efficient shortest-path graph algorithm.

Operation 306 includes creating the generated microservice based on a highest-cost subgraph of the cost-aware code dependency graph. Operation 308 includes replacing first source code associated with the highest-cost subgraph with calls to the generated microservice.

Operation 310 includes identifying a second subgraph in the cost-aware code dependency graph with a similarity above a threshold to the highest-cost subgraph. In some embodiments, graph similarity is determined based on an approximate graph isomorphism algorithm, such as algorithms based on approximate random walks, or Graph Neural Networks.

Operation 312 includes replacing second source code associated with the second subgraph with a call to the generated microservice. In other words, the method 300 enables similar components (e.g., subgraphs) of the application to reuse previously generated microservices. Reusing previously generated microservices improves efficiency by (i) avoiding the recreation of a similar microservice; and (ii) utilizing a microservice configured to execute on a specialized VM for more than one component of the application.

Figure 4:
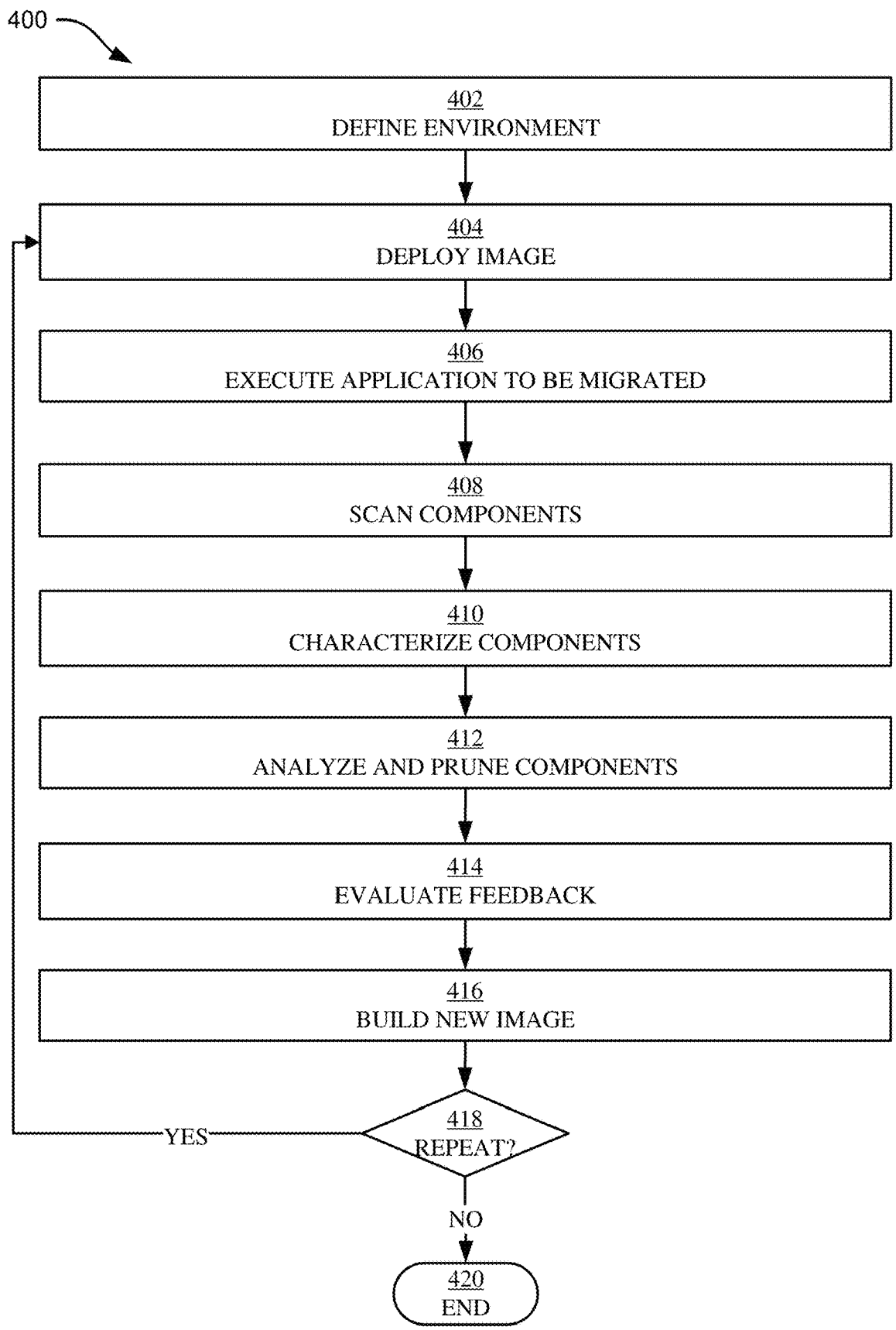
FIG. 4 illustrates a flowchart of another example method for migrating an application using a cost-aware code dependency graph, in accordance with some embodiments of the present disclosure.

Referring now to FIG. 4, illustrated is a flowchart of another example method 400 for application migration using a cost-aware code dependency graph, in accordance with some embodiments of the present disclosure. In some embodiments, the method 400 can be implemented by, for example, a target cloud infrastructure 108, a migration engineer manager device 104, a remote data processing system, a computer, a processor, or another configuration of hardware and/or software.

Operation 402 includes defining a migration environment. Operation 402 can include, for example, defining an image for analysis. The image can include the application to be migrated and any underlying software infrastructure required to run it. The image can be used to start virtualized components such as containers and virtual machines. Operation 402 can further include defining metrics and/or parameters to be considered in the analysis. Example metrics can include frequency of utilization of each component of the image, data Input/Output (I/O) patterns, resource utilization, time spent on each component, and the like. In some embodiments, the defined metrics and/or parameters can be converted to an objective function that can be reduced below a threshold (e.g., minimized), increased above a threshold (e.g., maximized), or otherwise optimized.

Operation 404 includes deploying the defined image. Operation 404 can include deploying the image defined in operation 402 on a cloud environment configured using the metrics and/or parameters defined in operation 402. Operation 406 includes executing the application to be migrated for the purposes of analyzing the application to be migrated.

Operation 408 includes scanning components of the executed application to be migrated. In some embodiments, operation 408 can utilize traces, source code analysis, and/or system calls to scan the components of the executed application to be migrated and/or any other components that are used by the application when launched.

Operation 410 includes characterizing components identified in operation 408. Operation 410 can include generating a list of libraries and/or packages used by each identified component.

Operation 412 includes analyzing and pruning components. Operation 412 can identify elements to be reorganized and/or pruned based on the evaluation from operation 410. Operation 412 is discussed in more detail hereafter with respect to FIG. 5.

Operation 414 includes evaluating feedback. Operation 414 can collect feedback from, for example, data input to a migration engineer device by a migration engineer. Feedback can be evaluated to refine the decomposition, reorganization, and/or pruning strategy utilized in operation 412.

Operation 416 includes building a new image. The new image can decompose, reorganize, and/or prune elements of the application to be migrated as analyzed in operation 412 and refined in operation 414.

Operation 418 determines if the process should be repeated or not. If so, (418: YES), the system restarts the process by returning to operation 404 and redeploying the new image in order to troubleshoot, improve, and/or refine the modified application to be migrated. If not, (418: NO), the method 400 ends.

Figure 5:
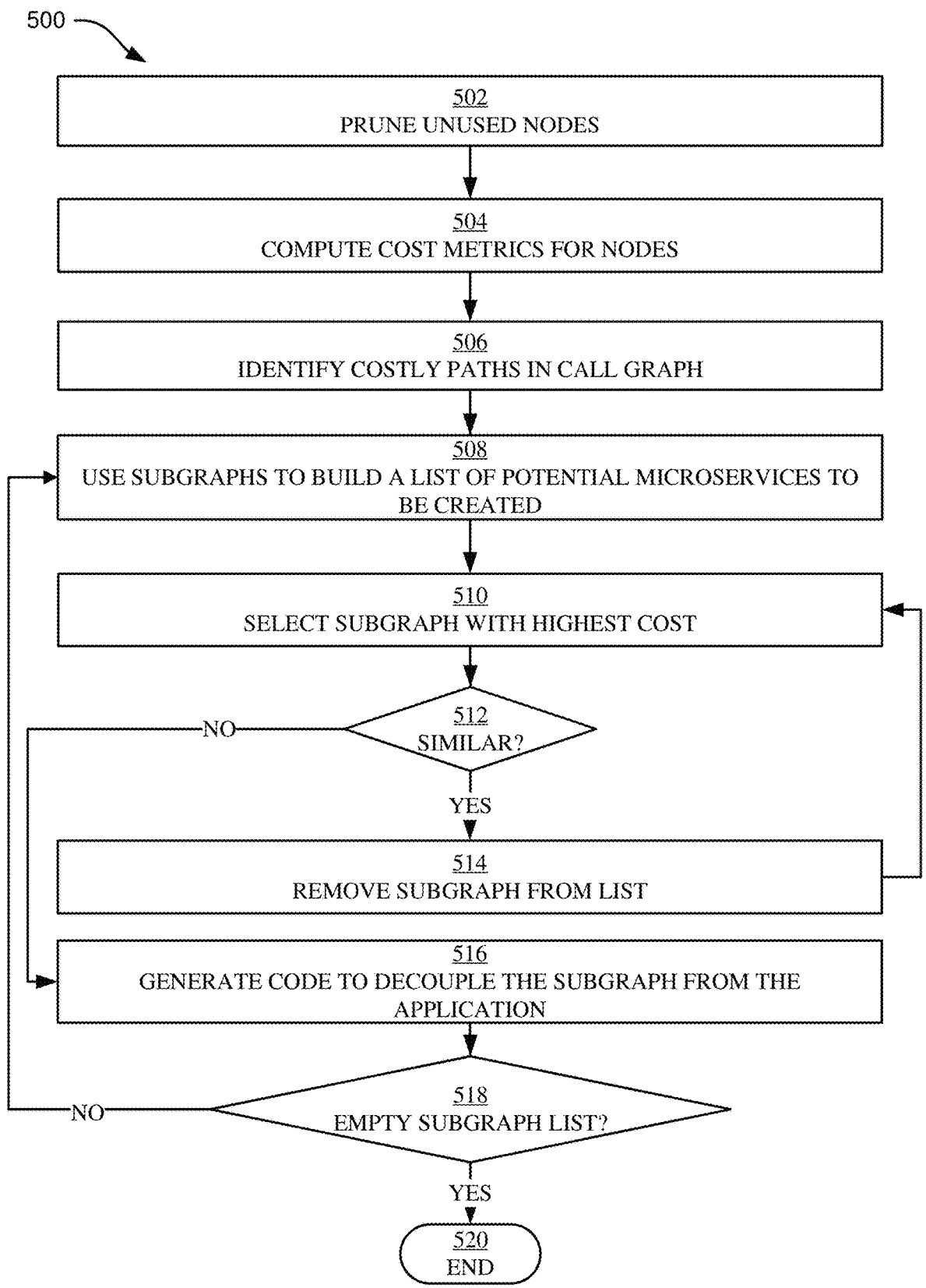
FIG. 5 illustrates a flowchart of an example method for analyzing, pruning, and modifying a migrated application, in accordance with some embodiments of the present disclosure.

Referring now to FIG. 5, illustrated is a flowchart of an example method 500 for analyzing and pruning an application to be migrated, in accordance with some embodiments of the present disclosure. In some embodiments, the method 500 can be implemented by, for example, a target cloud infrastructure 108, a migration engineer manager device 104, a remote data processing system, a computer, a processor, or another configuration of hardware and/or software. In some embodiments, the method 500 is a sub-method of operation 412 of FIG. 4.

Operation 502 includes pruning unused nodes. Pruning unused nodes can involve removing unused parts of the source code. For example, operation 502 can take into consideration parts of the source code that were not accessed during a user-defined time period. An example of operation 502 is discussed hereinafter with respect to FIG. 6A.

Operation 504 includes computing cost metrics for respective nodes. Cost metrics can be based on, for example, resource utilization (e.g., memory utilization, processing utilization, etc.), data Input/Output (I/O) patterns, a frequency of utilization, and/or other cost metrics. An example of operation 504 is discussed hereafter with respect to FIG. 4B.

Figure 6B:
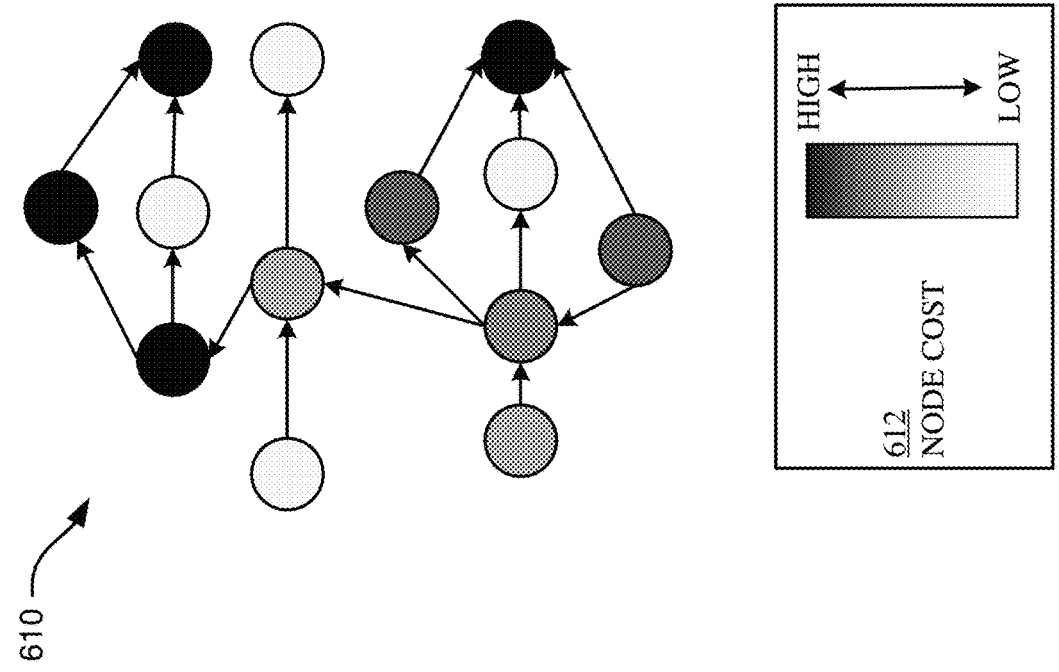
FIG. 6B illustrates a diagram of a cost-aware code dependency graph having nodes with varying computational costs associated therewith, in accordance with some embodiments of the present disclosure.
Figure 7:
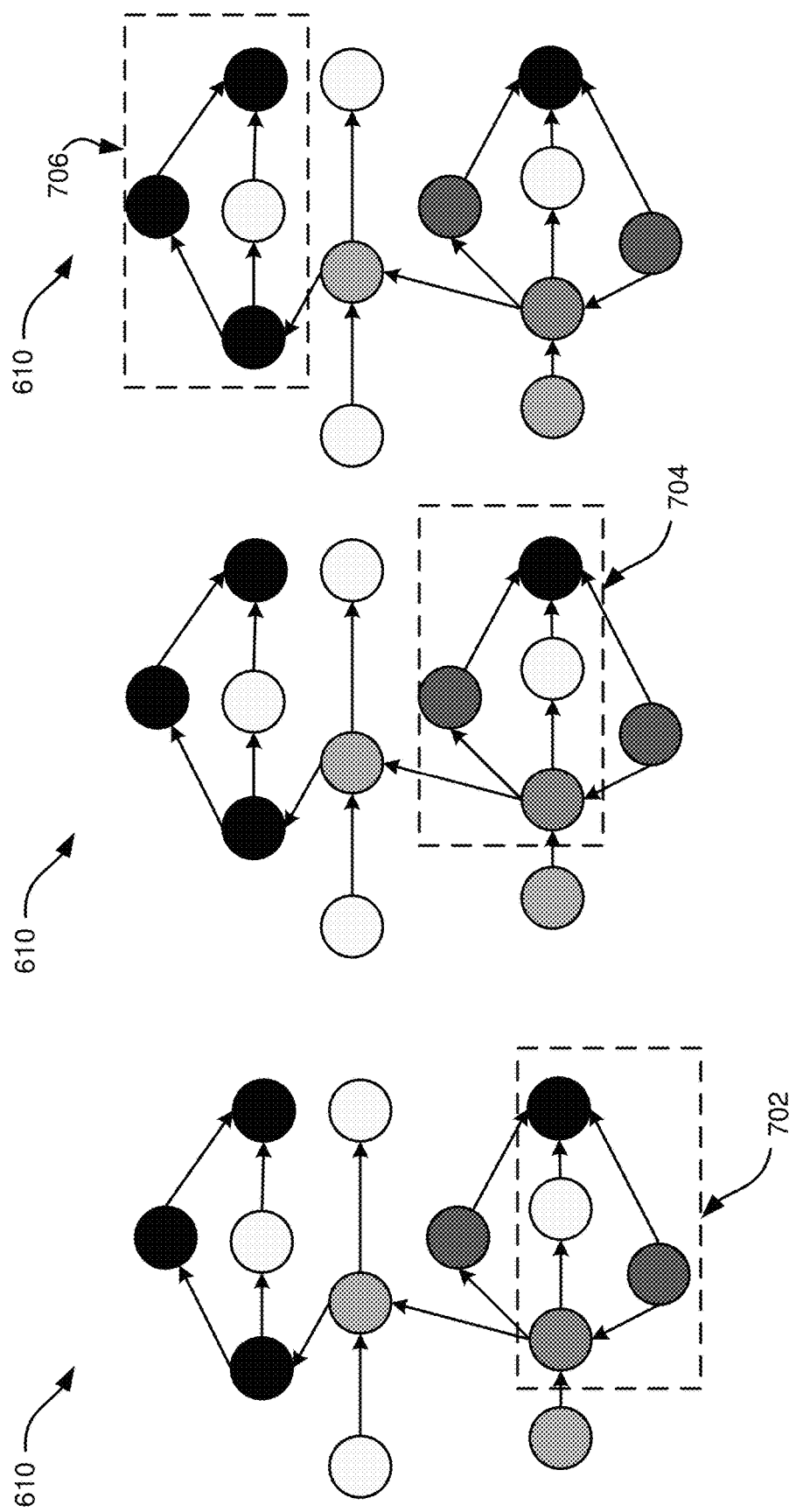
FIG. 7 illustrates a diagram of different high-cost paths in a cost-aware code dependency graph, in accordance with some embodiments of the present disclosure.

Operation 506 includes identifying costly paths in a call graph (e.g., a cost-aware code dependency graph) associated with the application to be migrated based on the cost metrics computed in operation 504. In some embodiments, operation 506 computes cost paths between all nodes in the graph. Doing so can be done in $O(|E|+|V|\log|V|)$ time when using the Dijkstra algorithm with Fibonacci heaps as the priority queue. Furthermore, although the node cost graph discussed hereinafter with respect to FIGS. 6B and 7 is implemented with weights (e.g., costs) in the nodes, to be able to use a graph search algorithm, embodiments of the present disclosure can convert node weights to edge weights. One such way for doing so is assigning weights of all edges coming into a node as equal to that node's weight.

Operation 508 includes using the subgraphs to build a list of potential microservices to be created. Operation 510 includes selecting the subgraph with the highest cost to convert to a microservice.

Operation 512 includes determining if the selected subgraph is similar to other subgraphs. Determinations of similarity can utilize an approximate graph isomorphism algorithm. If the selected subgraph is similar to another subgraph (512: YES), then the method 500 can proceed to operation 514 and remove the similar subgraph from the list of potential microservices to be created. In some embodiments, operation 514 further causes the similar subgraph to utilize a previously generated microservice associated with the other subgraph. The method 500 can then return to operation 510. If the selected subgraph is not similar to another subgraph (512: NO), then the method 500 can proceed to operation 516 and generate code to decouple the subgraph from the original application (e.g., by creating a microservice). A variety of methodologies can be employed to generate the code associated with the subgraph. For instance, automatic creation of rest Application Programming Interfaces (APIs) can be used to emulate the interface of the original application and newly created microservice.

Operation 518 includes determining if the listing of subgraphs in the cost-aware code dependency graph is empty or a threshold of generated microservices is reached. If operation 518 is not satisfied (518: NO), the method 500 can return to operation 508 and select a new subgraph of the list of potential microservices. If operation 518 is satisfied (518: YES), then the method 500 can end.

Figure 6A:
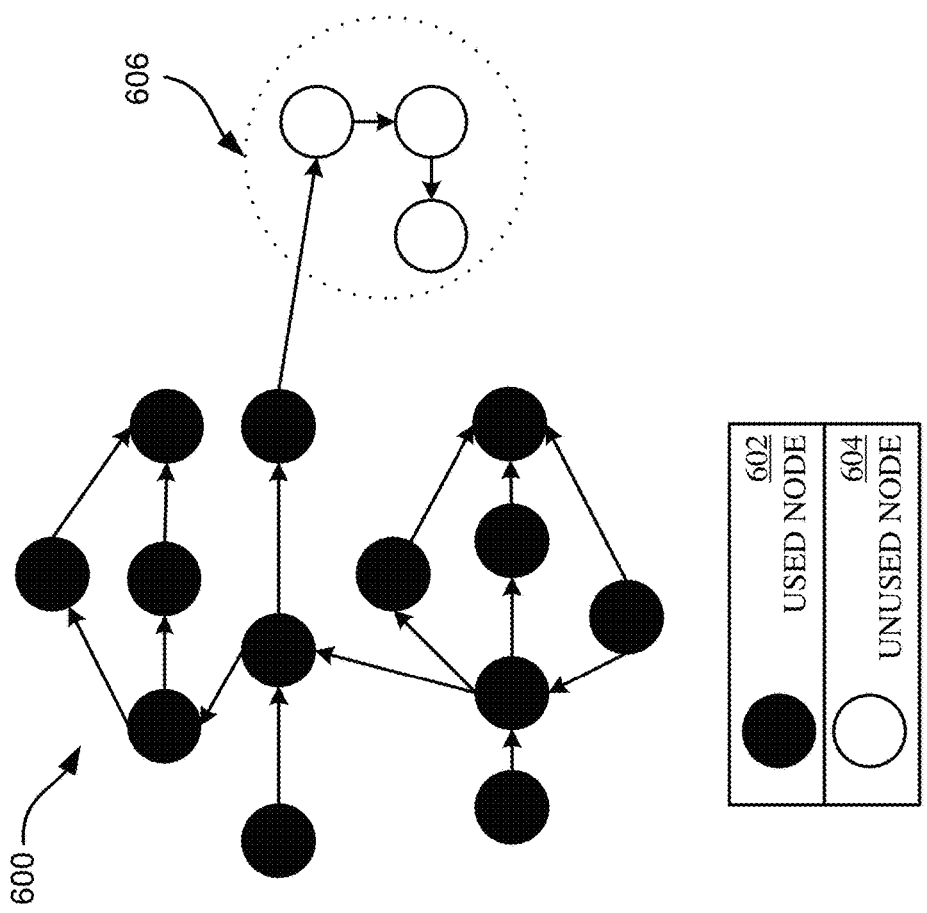
FIG. 6A illustrates a diagram of a cost-aware code dependency graph having used nodes and unused nodes, in accordance with some embodiments of the present disclosure.

FIG. 6A illustrates an example cost-aware code dependency graph 600 of an application to be migrated having used nodes 602 (shaded) and unused nodes 604 (unshaded), in accordance with some embodiments of the present disclosure. An unused segment 606 of the cost-aware code dependency graph 600 includes exclusively unused nodes 604. Accordingly, aspects of the present disclosure are directed toward pruning the unused segment 606 including all unused nodes 604 therein (e.g., by removing code from the source code corresponding to the unused nodes 604 in the unused segment 606).

FIG. 6B illustrates an example cost-aware code dependency graph 610 where each node is weighted by a node cost 612. As can be seen, cost-aware code dependency graph 610 is similar to cost-aware code dependency graph 600 of FIG. 6A except the cost-aware code dependency graph 610 of FIG. 6B has the unused segment 606 of unused nodes 604 removed. Referring back to FIG. 6B, node cost 612 can represent lower cost nodes as a lighter shade and higher cost nodes as a darker shade. Node cost 612 can be representative of memory resources, processing resources, networking resources, I/O resources, and/or other resources that are consumed in implementing each respective node. As can be seen, different nodes in cost-aware code dependency graph 610 are associated with different node costs 612.

FIG. 7 illustrates a diagram of different subgraphs in the cost-aware code dependency graph 610 of FIG. 6B. For example, aspects of the present disclosure can identify subgraph 702, subgraph 704, and subgraph 706, among other subgraphs. Furthermore, aspects of the present disclosure can be configured to determine that subgraph 704 is similar to subgraph 706 (e.g., using an approximate graph isomorphism algorithm). In identifying two or more similar subgraphs, aspects of the present disclosure can generate a single microservice that can be utilized for each of the similar subgraphs.

Figure 8:
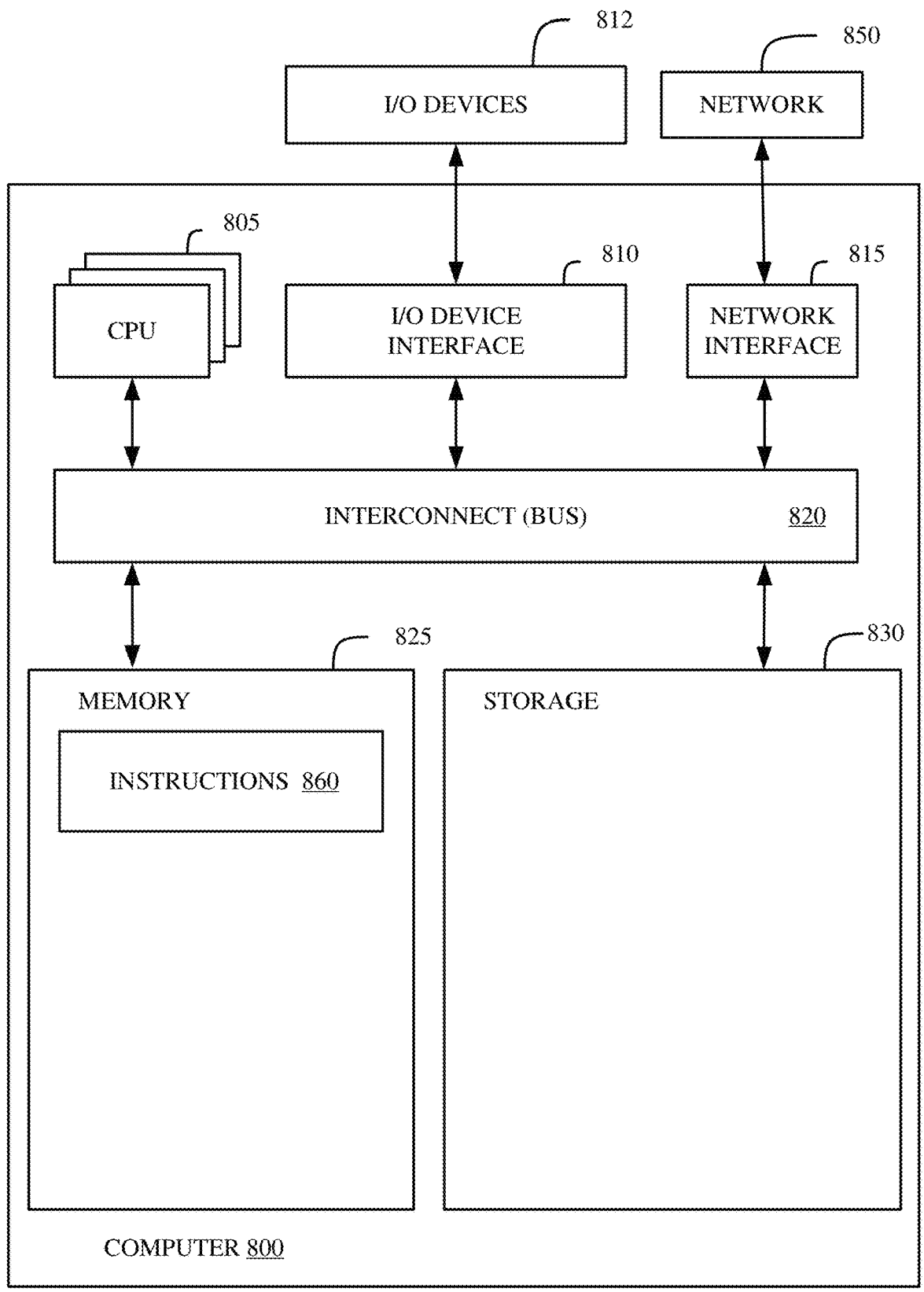
FIG. 8 illustrates a block diagram of an example computer, in accordance with some embodiments of the present disclosure.

FIG. 8 illustrates a block diagram of an example computer 800 in accordance with some embodiments of the present disclosure. In various embodiments, computer 800 can perform any or all of the methods described in FIGS. 2-5 and/or implement the functionality discussed in one or more of FIGS. 1 and 6-7. In some embodiments, computer 800 receives instructions related to the aforementioned methods and functionalities by downloading processor-executable instructions from a remote data processing system via network 850. In other embodiments, computer 800 provides instructions for the aforementioned methods and/or functionalities to a client machine such that the client machine executes the method, or a portion of the method, based on the instructions provided by computer 800. In some embodiments, the computer 800 is incorporated into (or functionality similar to computer 800 is virtually provisioned to) one or more entities of the computational environment 100 (e.g., migration engineer manager device 104, source cloud infrastructure 106, and/or target cloud infrastructure 108) and/or other aspects of the present disclosure.

Computer 800 includes memory 825, storage 830, interconnect 820 (e.g., BUS), one or more CPUs 805 (also referred to as processors herein), I/O device interface 810, I/O devices 812, and network interface 815.

Each CPU 805 retrieves and executes programming instructions stored in memory 825 or storage 830. Interconnect 820 is used to move data, such as programming instructions, between the CPUs 805, I/O device interface 810, storage 830, network interface 815, and memory 825. Interconnect 820 can be implemented using one or more busses. CPUs 805 can be a single CPU, multiple CPUs, or a single CPU having multiple processing cores in various embodiments. In some embodiments, CPU 805 can be a digital signal processor (DSP). In some embodiments, CPU 805 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random-access memory (e.g., static random-access memory (SRAM), dynamic random-access memory (DRAM), or Flash). Storage 830 is generally included to be representative of a non-volatile memory, such as a hard disk drive, solid state device (SSD), removable memory cards, optical storage, or flash memory devices. In an alternative embodiment, storage 830 can be replaced by storage area-network (SAN) devices, the cloud, or other devices connected to computer 800 via I/O device interface 810 or network 850 via network interface 815.

In some embodiments, memory 825 stores instructions 860. However, in various embodiments, instructions 860 are stored partially in memory 825 and partially in storage 830, or they are stored entirely in memory 825 or entirely in storage 830, or they are accessed over network 850 via network interface 815.

Instructions 860 can be computer-readable and computer-executable instructions for performing any portion of, or all of, the methods of FIGS. 2-5 and/or implementing the functionality discussed in any portion of FIGS. 1 and 6-7. Although instructions 860 are shown in memory 825, instructions 860 can include program instructions collectively stored across numerous computer-readable storage media and executable by one or more CPUs 805.

In various embodiments, I/O devices 812 include an interface capable of presenting information and receiving input. For example, I/O devices 812 can present information to a user interacting with computer 800 and receive input from the user.

Computer 800 is connected to network 850 via network interface 815. Network 850 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
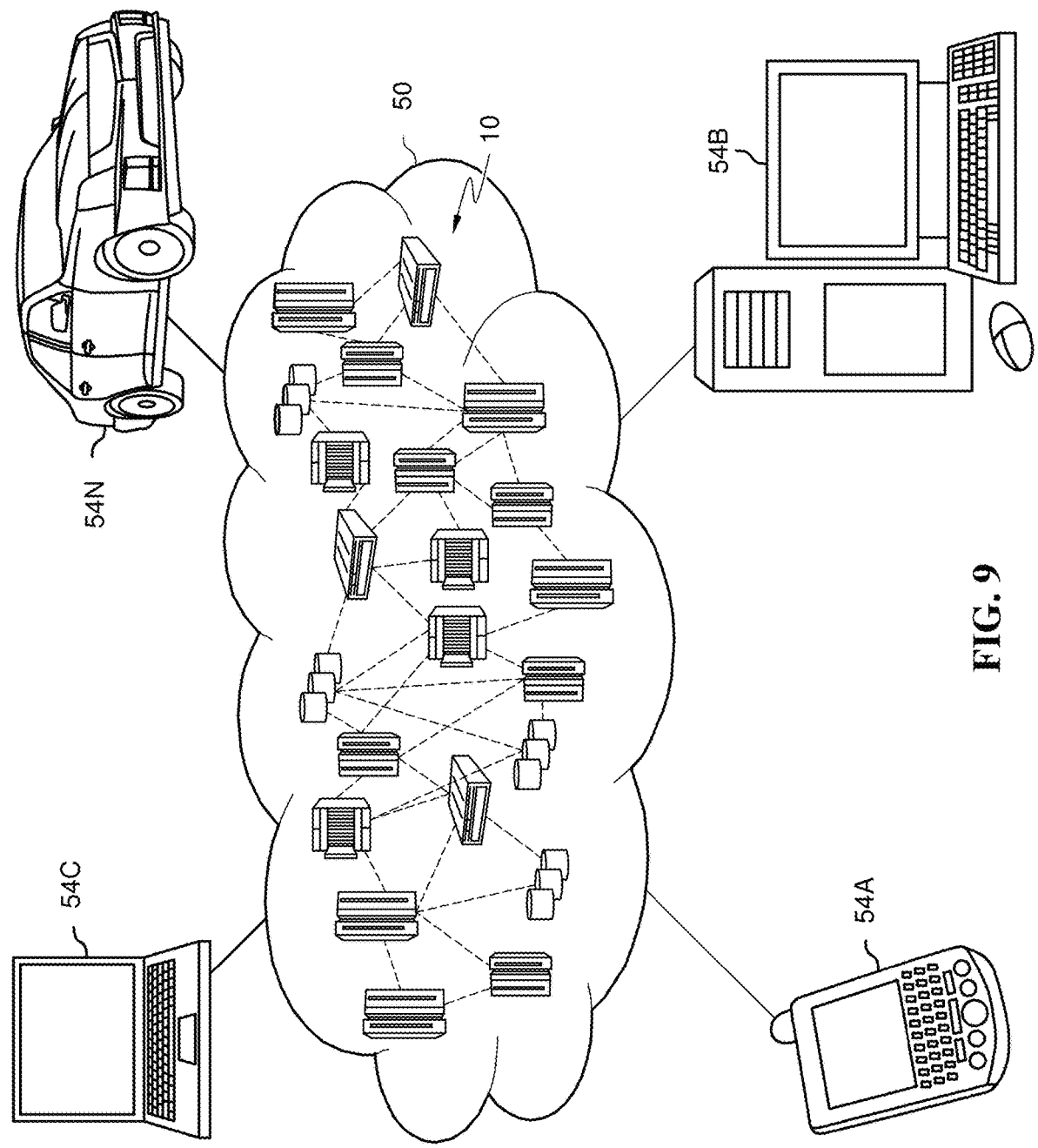
FIG. 9 depicts a cloud computing environment, in accordance with some embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
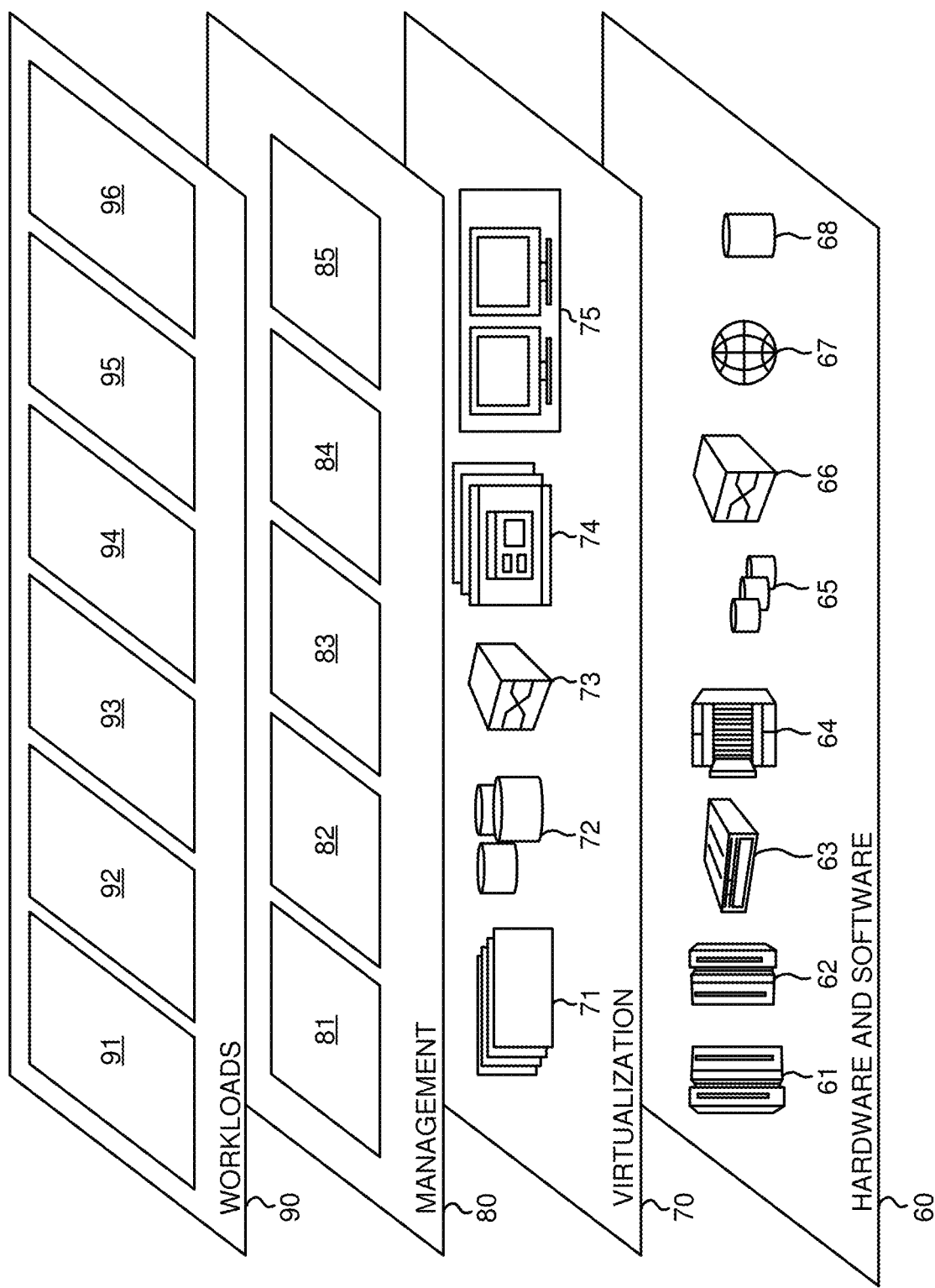
FIG. 10 depicts abstraction model layers, in accordance with some embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application migration management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 860 of FIG. 8 and/or any software configured to perform any portion of the methods described with respect to FIGS. 2-5 and/or implement any portion of the functionality discussed in FIGS. 1 and 6-7) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes migrating an application to a target cloud infrastructure; generating a cost-aware code dependency graph during execution of the application on the target cloud infrastructure; modifying the application by: removing unused source code corresponding to unused nodes according to the cost-aware code dependency graph; and replacing identified source code of a high-cost subgraph of the cost-aware code dependency graph with calls to a generated microservice configured to provide functionality similar to the identified source code; and implementing the modified application on one or more virtual machines of the target cloud infrastructure.

Example 2 includes the method of example 1, including or excluding optional features. In this example, the cost-aware code dependency graph is generated using trace functions on the application during the execution and source code analysis of the application.

Example 3 includes the method of any one of examples 1 to 2, including or excluding optional features. In this example, the generated microservice associated with the modified application is executed on a different virtual machine of the target cloud infrastructure relative to the one or more virtual machines implementing the modified application. Optionally, the different virtual machine is associated with a distinct set of resources adapted for the generated microservice relative to resources of the one or more virtual machines implementing the modified application.

Example 4 includes the method of any one of examples 1 to 3, including or excluding optional features. In this example, the unused nodes are nodes that are not used for a predefined amount of execution time.

Example 5 includes the method of any one of examples 1 to 4, including or excluding optional features. In this example, replacing the identified source code of high-cost subgraphs of the cost-aware code dependency graph further comprises determining a cost associated with each node in the cost-aware code dependency graph, wherein the cost is representative of an amount of resources utilized during node execution. Optionally, the resources comprise one or more selected from a group consisting of: memory utilized during the node execution, processor (CPU) usage during the node execution, Input/Output (I/O) operations implemented during the node execution, a frequency of node utilization over a predefined time, and duration of the node execution.

Example 6 includes the method of any one of examples 1 to 5, including or excluding optional features. In this example, replacing the identified source code of high-cost subgraphs of the cost-aware code dependency graph further comprises converting node costs in the cost-aware code dependency graph to edge costs by assigning a respective cost of a respective node to each edge directed to the respective node. Optionally, replacing the identified source code of high-cost subgraphs of the cost-aware code dependency graph further comprises computing cost paths between nodes in the cost-aware code dependency graph using a shortest-path graph algorithm.

Example 7 includes the method of any one of examples 1 to 6, including or excluding optional features. In this example, replacing the identified source code of high-cost subgraphs of the cost-aware code dependency graph with calls to the generated microservice further comprises: creating the generated microservice based on a highest-cost subgraph; replacing first source code associated with the highest-cost subgraph with the generated microservice; identifying a second subgraph with a similarity above a threshold to the highest-cost subgraph; and replacing second source code associated with the second subgraph with the generated microservice. Optionally, identifying the second subgraph with the similarity above the threshold is based on an approximate graph isomorphism algorithm.

Example 8 includes the method of any one of examples 1 to 7, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 9 is a system. The system includes one or more processors; and one or more computer-readable storage media storing program instructions which, when executed by the one or more processors, are configured to cause the one or more processors to perform a method according to any one of examples 1 to 8.

Example 10 is a computer program product. The computer program product comprising one or more computer readable storage media, and program instructions collectively stored on the one or more computer readable storage media, the program instructions comprising instructions configured to cause one or more processors to perform a method according to any one of examples 1 to 8.

What is claimed is:

1. A computer-implemented method comprising:
   migrating an application from a source cloud infrastructure to a target cloud infrastructure using a system image of the application;
   generating a cost-aware code dependency graph during execution of the application on the target cloud infrastructure by computing cost paths between nodes in the cost-aware code dependency graph using a Dijkstra algorithm with Fibonacci heaps as a priority queue;
   modifying the application by:
      removing unused source code corresponding to unused nodes according to the cost-aware code dependency graph; and
      replacing identified source code that is not a microservice of a highest-cost subgraph of the cost-aware code dependency graph with calls to a generated microservice configured to provide functionality similar to the identified source code by:
- creating the generated microservice based on the highest-cost subgraph;
- replacing first source code associated with the highest-cost subgraph with the generated microservice;
- identifying a different subgraph in the cost-aware code dependency graph with a similarity above a threshold to the highest-cost subgraph; and
- replacing second source code associated with the different subgraph with the generated microservice; and implementing the modified application on one or more virtual machines of the target cloud infrastructure.

2. The method of claim 1, wherein the cost-aware code dependency graph is generated using trace functions, log analysis, and system calls on the application.

3. The method of claim 1, wherein the generated microservice associated with the modified application is executed on a different virtual machine of the target cloud infrastructure relative to the one or more virtual machines implementing the modified application.

4. The method of claim 3, wherein the different virtual machine is associated with a distinct set of resources adapted for the generated microservice relative to resources of the one or more virtual machines implementing the modified application.

5. The method of claim 1, wherein the unused nodes are nodes that are not used for a predefined amount of execution time.

6. The method of claim 1, wherein replacing the identified source code of the highest-cost subgraph of the cost-aware code dependency graph further comprises determining a cost associated with each node in the cost-aware code dependency graph, wherein the cost is representative of an amount of resources utilized during node execution.

7. The method of claim 6, wherein the resources comprise memory utilized during the node execution, processor (CPU) usage during the node execution, Input/Output (I/O) operations implemented during the node execution, a frequency of node utilization over a predefined time, and duration of the node execution.

8. The method of claim 1, wherein replacing the identified source code of the highest-cost subgraph of the cost-aware code dependency graph further comprises converting node costs in the cost-aware code dependency graph to edge costs by assigning a respective cost of a respective node to each edge directed to the respective node.

9. The method of claim 1, wherein identifying the different subgraph with the similarity above the threshold is based on a Graph Neural Network (GNN).

10. The method of claim 1, wherein the method is performed by one or more computers according to software that is downloaded to the one or more computers from a remote data processing system.

11. The method of claim 10, wherein the method further comprises:
- metering a usage of the software; and
- generating an invoice based on metering the usage.

12. A system comprising:
- one or more processors; and
- one or more computer-readable storage media storing program instructions which, when executed by the one or more processors, are configured to cause the one or more processors to perform a method comprising:
  - migrating an application from a source cloud infrastructure to a target cloud infrastructure using a system image of the application;
  - generating a cost-aware code dependency graph during execution of the application on the target cloud infrastructure by computing cost paths between nodes in the cost-aware code dependency graph using a Dijkstra algorithm with Fibonacci heaps as a priority queue;
  - modifying the application by:
    - removing source code corresponding to unused nodes according to the cost-aware code dependency graph; and
    - replacing identified source code that is not a microservice of a highest-cost subgraph of the cost-aware code dependency graph with calls to a generated microservice configured to provide functionality similar to the identified source code by:
      - creating the generated microservice based on the highest-cost subgraph;
      - replacing first source code associated with the highest-cost subgraph with the generated microservice;
      - identifying a different subgraph in the cost-aware code dependency graph with a similarity above a threshold to the highest-cost subgraph; and
      - replacing second source code associated with the different subgraph with the generated microservice; and
  - implementing the modified application on one or more virtual machines of the target cloud infrastructure.

13. The system of claim 12, wherein the cost-aware code dependency graph is generated using trace functions, log analysis, and system calls on the application.

14. The system of claim 12, wherein the generated microservice associated with the modified application is executed on a different virtual machine of the target cloud infrastructure relative to the one or more virtual machines implementing the modified application, and wherein the different virtual machine is associated with a distinct set of resources adapted for the generated microservice relative to resources of the one or more virtual machines implementing the modified application.

15. The system of claim 12, wherein replacing the identified source code of the highest-cost subgraph of the cost-aware code dependency graph further comprises:
- converting node costs in the cost-aware code dependency graph to edge costs by assigning a respective cost of a respective node to each edge directed to the respective node; and
- computing cost paths between nodes in the cost-aware code dependency graph using the Dijkstra algorithm with Fibonacci heaps as the priority queue.

16. The system of claim 12, wherein identifying the different subgraph with the similarity above the threshold is based on a Graph Neural Network (GNN).

17. A computer program product comprising one or more non-transitory computer readable storage media, and program instructions collectively stored on the one or more non-transitory computer readable storage media, the program instructions comprising instructions configured to cause one or more processors to perform a method comprising:
- migrating an application from a source cloud infrastructure to a target cloud infrastructure using a system image of the application;
- generating a cost-aware code dependency graph during execution of the application on the target cloud infrastructure by computing cost paths between nodes in the cost-aware code dependency graph using a Dijkstra algorithm with Fibonacci heaps as a priority queue;

modifying the application by:
- removing source code corresponding to unused nodes according to the cost-aware code dependency graph; and
- replacing identified source code that is not a microservice of a highest-cost subgraph of the cost-aware code dependency graph with calls to a generated microservice configured to provide functionality similar to the identified source code by:
  - creating the generated microservice based on the highest-cost subgraph;
  - replacing first source code associated with the highest-cost subgraph with the generated microservice;
  - identifying a different subgraph in the cost-aware code dependency graph with a similarity above a threshold to the highest-cost subgraph; and
  - replacing second source code associated with the different subgraph with the generated microservice; and implementing the modified application on one or more virtual machines of the target cloud infrastructure.

18. The computer program product of claim 17, wherein identifying the different subgraph with the similarity above the threshold is based on a Graph Neural Network (GNN).

* * * * *